United States Patent
Hellmann et al.

Patent Number: 6,125,320
Date of Patent: Sep. 26, 2000

[54] DEVICE FOR SELECTING AND DISPLAYING SPEEDS

[75] Inventors: Manfred Hellmann, Hardthof; Hermann Winner, Karlsruhe; Stefan Witte, Minden, all of Germany

[73] Assignee: Robert Bosch GmbH, Stuttgart, Germany

[21] Appl. No.: 08/966,429

[22] Filed: Nov. 7, 1997

[30] Foreign Application Priority Data

Nov. 8, 1996 [DE] Germany .............. 196 46 104

[51] Int. Cl.[7] .............. G01P 1/10; B60K 31/04
[52] U.S. Cl. .............. 701/93; 701/96; 340/441
[58] Field of Search .............. 180/170, 171, 180/178; 701/93, 97, 96; 340/438, 441, 461

[56] References Cited

U.S. PATENT DOCUMENTS

| | | | |
|---|---|---|---|
| 4,631,513 | 12/1986 | Testima et al. .............. | 340/52 R |
| 4,858,135 | 8/1989 | Clish et al. .............. | 701/93 |
| 5,017,916 | 5/1991 | Londt et al. .............. | 340/870.13 |
| 5,673,987 | 10/1997 | Futschik et al. .............. | 362/23 |

FOREIGN PATENT DOCUMENTS 2183837  6/1987  United Kingdom .

OTHER PUBLICATIONS

Winner et al., Adaptive Cruise Control—System Aspects and Development Trends, SAE, Detroit, Feb. 25–29, 1996.

*Primary Examiner*—Tan Nguyen
*Attorney, Agent, or Firm*—Kenyon & Kenyon

[57] ABSTRACT

A device includes a first control unit for regulating the speed and/or acceleration of a vehicle and a second control unit for controlling a display with which at least one instantaneous actual speed vFA and a selected desired speed vsetA can be displayed. In order to match the two control units with regard to the prevailing speedometer lead, the second control unit includes an element with which the next higher and next lower selectable desired speeds can be determined. These selectable desired speeds are transmitted to the first control unit.

9 Claims, 2 Drawing Sheets

DEVICE FOR SELECTING AND DISPLAYING SPEEDS

FIELD OF THE INVENTION

The present invention relates to a device that includes two control units. The first control unit regulates the speed and/or acceleration of a vehicle. The second control unit controls one or more displays that provide the driver with information visually, acoustically or otherwise. The displayable information includes, in particular, the instantaneous speed of the vehicle. Such a display is known, in general, as a speedometer.

The second control unit is also a central control unit with which any information such the instantaneous engine speed, the contents of the gas tank, the time of day, etc. can be displayed, in addition to the instantaneous vehicle speed. This control unit need not necessarily include the specific output means, which may be designed as a display instrument or LC display. The control unit, however, drives these output means.

BACKGROUND INFORMATION

Devices (and methods) for regulating the speed and/or acceleration of a vehicle are known by the name of "Tempomat." Such a device can be supplemented by a sensor that can detect other vehicles driving in front of the vehicle, plus any obstacles in the direction of travel. Thus, the device may take into account not only its own internal traffic parameters, but also ambient parameters in the regulation of vehicle speed. Such devices are known in general as adaptive or dynamic road speed governors, and are also referred to as adaptive cruise control (ACC). A basic description of such a device is found, for example, in the article "Adaptive Cruise Control—System Aspects and Development Trends" by Winner, Witte et al., published at SAE 96 of Feb. 25–29, 1996, Detroit.

The driver of a vehicle having such an ACC unit can preselect a desired speed vset. If the road is free of slower-moving vehicles and any obstacles in the area in front of the vehicle, the ACC unit adjusts the speed vF of the vehicle to this selected desired speed. However, if there are slower-moving vehicles in the path of the vehicle being regulated, the vehicle will adjust to the speed of the slower-moving vehicle. A minimum distance, which can also be set, is maintained. Therefore, in heavy traffic, the ACC unit may establish for a long period of time a speed vF which is lower than the desired speed vset originally selected by the driver. Accordingly, with such an adaptive cruise control, it is necessary to first display for the driver the desired speed which the driver has set.

One example of how this can be accomplished is described in the above-mentioned article. In particular, a known speedometer is provided with additional LEDS in the area of its speed scale, i.e., above or below the individual scale values. On of the additional LEDs displays the selected desired speed. The prevailing speed is indicated by a speedometer needle in a known manner. One problem in this regard is that speed vFA displayed as the actual speed is usually higher than the actual instantaneous speed vF. This deviation Δv is known as the speedometer lead and is system-induced, mainly because of statutory requirements. Problems arise when the path in front of a vehicle operating on cruise control is clear and thus the vehicle operating on cruise control is traveling at the set speed vset. If the speed is set at 100 km/h, for example, the vehicle operating on cruise control will also travel at an actual speed vF of 100 km/h, disregarding individual tolerances. Then, because of the speedometer lead, a speed vFA of 105 km/hr, for example, will be displayed. At the same time, a display shows the driver that his selected desired speed is 100 km/h. This discrepancy gives the driver the impression that his vehicle is driving too fast and that perhaps the cruise control is just malfunctioning.

This disadvantage can be eliminated by taking into account speedometer lead Δv in setting a desired speed. However, since the speedometer lead can vary from one vehicle to the other and thus especially from one manufacturer to other, this requires a very high application expense in setting up and adapting an ACC unit to a vehicle.

SUMMARY OF THE INVENTION

An object of the present invention is thus to provide a device for selecting and displaying speeds, in which the application expense incurred in adapting an ACC unit to manufacturer-specific and/or vehicle-specific characteristics is reduced. In particular, the present invention ensures (in a universal manner) that a desired speed vset set in the ACC unit is displayed in appropriate agreement with the individual lead properties of a display control unit. This includes, among other things, the fact that a set desired speed vset and an actual prevailing speed vF must be displayed as identical when the vehicle is in the ACC mode and no slower-moving vehicles are present in front of the vehicle.

This object is achieved according to the present invention by having a display control unit, provided in a vehicle, supply information to the ACC unit. In particular, it is not the ACC unit but the display control unit that calculates the closest possible desired speeds and relays them to the ACC unit. Communication between the two control units is preferably based on a prevailing actual speed, i.e., the speed transmitted does not include a speedometer lead.

An advantage of the present invention is that the application expense which is necessary to match an ACC unit and a display control unit to each other is substantially reduced. In addition, achieving the object of the present invention includes the possibility of implementing different operating philosophies of different automotive manufacturers in the ACC unit in a simple manner. Many operating philosophies have in common the fact that the desired speeds for cruise control are selected by the driver in fixed predetermined increments. However, there are differences with regard to the speed range within which, i.e., between which maximum and minimum speeds, the cruise control is to operate. Furthermore, one manufacturer may prefer speed increments of 10 km/h, while another may prefer increments of 5 km/h. Since, in the device according to the present invention, the selectable desired speeds are no longer determined in the ACC unit but are, instead, determined in the display control unit, the ACC unit is independent of the individual operating philosophies. In contrast to the ACC unit, a display control unit is fundamentally subject to the manufacturer's philosophy, mainly because of the different output means utilized. Accordingly, the cost of implementing different operating philosophies here is comparatively low.

DETAILED DESCRIPTION

Figure 1:
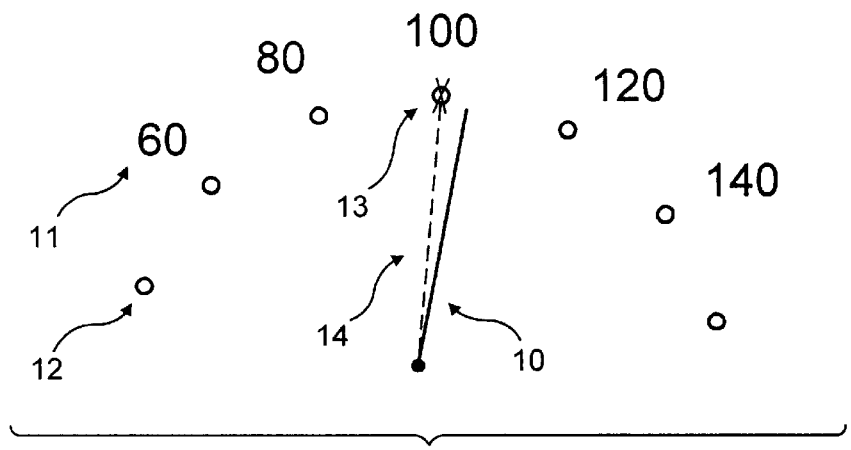
FIG. 1 shows a speedometer display for a prevailing actual speed and a selected desired speed.

FIG. 1 shows a diagram of a speed display such as that described in the article cited above. Speed values 11 of 60 km/h to 140 km/h, for example, are arranged along a sector of a circle. A speedometer needle 10 is mounted at the center of the imaginary circle and indicates a speed of slightly more than 100 km/h. LED 12 is shown below each speed value 11. The LEDs serve to display the desired speed set in each case. LED 13 at speed mark 100 km/h is indicated with an "x." This symbolizes that this LED is lighted up, in contrast with all the others. This corresponds, for example, to the situation where the driver has set a desired speed of 100 km/h. If there is no slower-moving vehicle in the path of the vehicle operating on cruise control, the system will cause the ACC unit to set a speed of 100 km/h. However, due to speedometer lead $\Delta v$ of the display unit, speedometer needle 10 then displays a value higher than 100 km/h. Dashed line 14 indicates the needle position at which the displays of the set desired speed and the actual prevailing speed would be matched to one another. The driver of a vehicle operating on cruise control would, in all probability, be irritated by a display according to FIG. 1 and would assume that the cruise control was malfunctioning.

Figure 2:
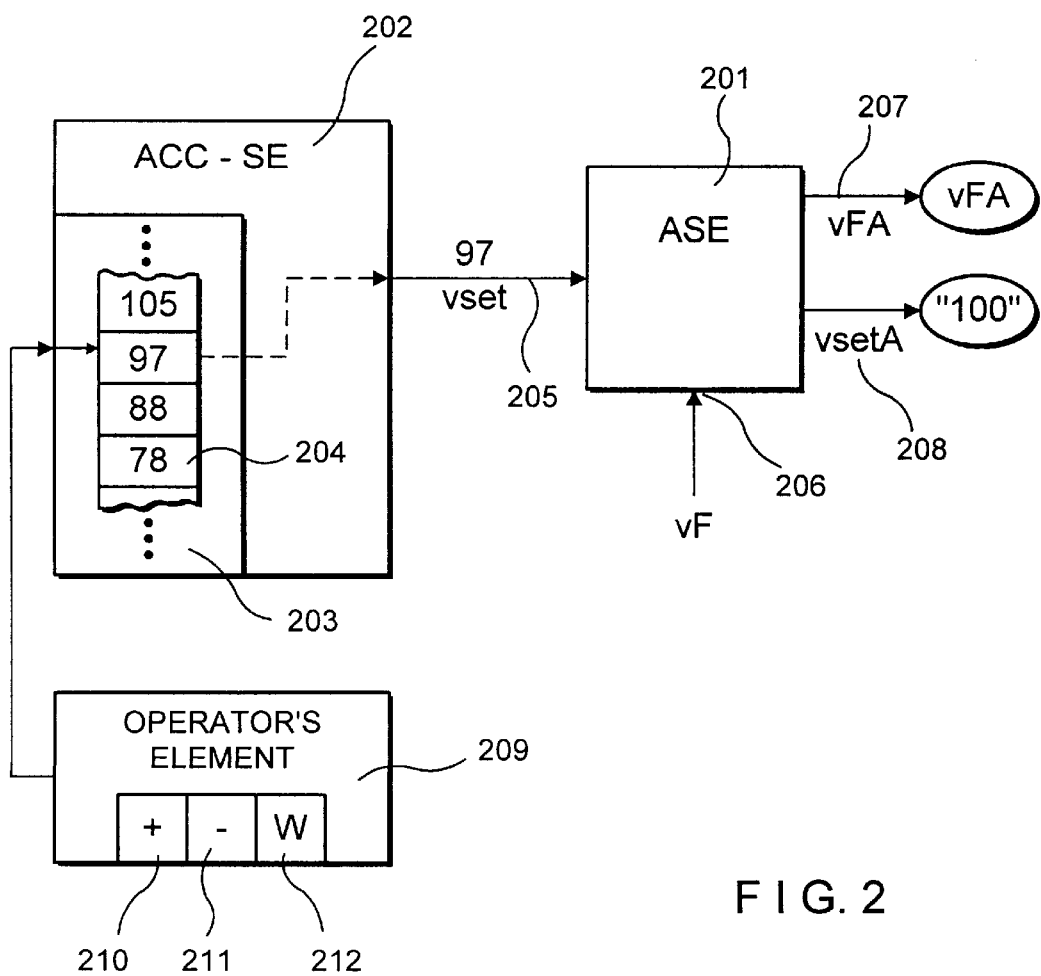
FIG. 2 shows a block diagram of a known application-intensive device and method of ensuring that a desired speed is displayed in agreement with the speedometer lead.

FIG. 2 is a block diagram of an example of a known device which provides one solution for the aforementioned problem. The figure shows a display unit 201 with an ACC unit 202. The latter includes, in addition to all the elements that serve to regulate the speed and are not shown further here, at least one memory 203. Individual selectable desired speeds 204 are stored in this memory. For example, values of 78 km/h, 88 km/h, 97 km/h and 105 km/h are stored here in individual memory cells. This illustrates the fact that the values stored here are "curved" values, i.e., they already take into account an individual speedometer lead of display unit 201.

The selected desired speed vset is transmitted by ACC unit 202 over a connection 205 to display control unit 201. A selected value of vset =97 km/h is assumed here as an example. In addition to this value, display control unit 201 receives at least the prevailing speed vF (206) as another input quantity. These two input quantities are displayed by display control unit 201 with their respective individual speedometer leads. The value of displayed prevailing speed vFA is output at 207. This value is obtained from actual instantaneous speed vF and an individual speedometer lead $\Delta v1$, and it controls the deflection of a speedometer needle 10, for example, according to FIG. 1.

Assuming that the speed of the vehicle is determined by ACC unit 202, i.e., the cruise control is activated and there is no slower-moving vehicle in the path of the vehicle a operating on cruise control, the actual speed of the vehicle will be vF=97 kmrh in this case, in accordance with the value vset selected here in FIG. 2. However, because of the speedometer lead, a speed vFA=100 km/h is displayed when the two control units are properly matched.

The value of selected and displayed desired speed vseta is output at 208. It is obtained from selected desired speed vset and a speedometer lead $\Delta v2$. This value then activates an LED at the speed mark for 100 km/h with the assumed speed values in the example from FIG. 1. In this example, speedometer lead $\Delta v2$ amounts to 3 km/h, and is identical to speedometer lead $\Delta v1$. (Although this provides certain advantages, it is not necessary that the speedometer leads $\Delta v1$ and $\Delta v2$ be identical.)

An operator's element 209 has a plus key 210, a minus key 211 and a resume key 212. The signals of operator's element 209 are sent to ACC unit 202.

The interaction and operation of the device described here are as follows: The driver activates the cruise control with plus key 210 or minus key 211 and selects incrementally the next higher or lower desired speed vset. The selected desired speed serves as the setpoint speed for a governor (not shown) of the ACC unit. Accordingly, the speed actually traveled by the vehicle is adjusted to this value if there are no slower-moving vehicles or obstacles. At the same time, selected value vset is transmitted to display control unit 201. In order for displayed value vFA of prevailing speed vF to be identical to displayed value vsetA of selected desired speed vset, the selectable desired speeds vset must be stored in the ACC unit in such a way that the respective speedometer lead of display control unit 201 is taken into account. This requires the above-mentioned high application expense for each individual ACC unit.

As an alternative, the driver of the vehicle can activate the cruise control by means of resume key 212. In this case, desired speed vset of the last value selected is assumed, i.e., the value selected as the desired speed when the cruise control was turned off last.

Figure 3:
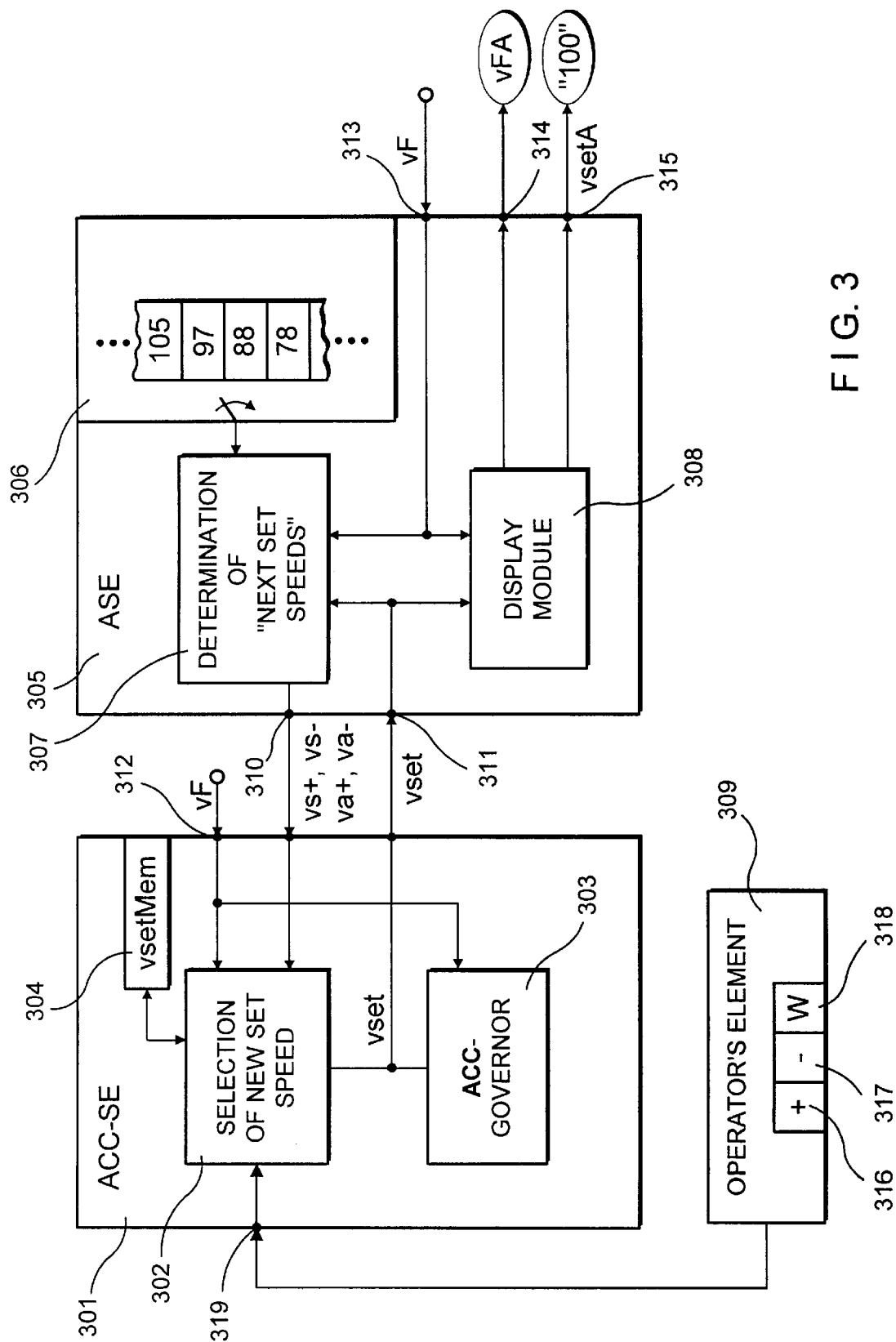
FIG. 3 shows a block diagram of a device according an exemplary embodiment of the present invention.

FIG. 3 shows a device according to the present invention consisting of an ACC unit 301 and a display control unit 305. The ACC unit includes the actual cruise control governor 303 and a block 302 in which the future desired speed vset is determined. This block receives the signals from an operator's element 309 by means of which the driver of the vehicle can set or select a desired speed. In addition, a memory element 304 of the ACC unit stores a last selected value vsetMem of the selected desired speed vset. This value and instantaneous speed vF are also sent to block 302. Instantaneous speed vF can be determined with the help of speed sensors that are present in each vehicle. It is also sent to actual ACC governor 303.

Display control unit 305 includes a display module 308 that performs the actual output of the values to be displayed. This display module 308 sends at least two signals, one signal 314 indicating actual speed vFA to be displayed, and signal 315 indicating desired speed vsetA to be displayed. The actual instantaneous speed vF is sent to display module 308 on a signal path 313.

According to the present invention, display control unit 305 includes a memory 306 where all selectable desired speeds vset are stored in accordance with the operating philosophy of the given automotive manufacturer. These values are preferably stored as real speeds, i.e., without any speedometer lead. Thus they appear as "curved" values accordingly. As an alternative, the memory may also contain one or more algorithms on the basis of which selectable desired speeds vset can be determined at any time.

A block 307, which is also contained in display control unit 305, serves to determine the closest possible selectable desired speeds. It therefore receives from ACC unit 301 the desired speed vset currently selected. In addition, it receives actual travel speed vF. Finally, block 307 is connected to the memory of all selectable speeds 306. The selectable desired speeds (explained in greater detail below) which are determined by block 307 are transmitted over an interface 310 to block 302 of ACC unit 301.

As already explained with regard to FIG. 2, operator's element 309 has a plus key 316, a minus key 317 and a resume key 318. Its signals are sent via interface 319 to the ACC unit or to block 302 contained in it.

The operation and functioning of the device are as follows: The cruise control is activated by one of the three keys 316 through 318 of operator's element 309. If the driver actuates resume key 318, the last selected value vsetMem stored in memory element 304 is again established as desired speed vset. This value is sent to governor 303. At the same time, this value vset is relayed to the display control unit within which it goes to display module 308 and also to block 307. Then, based on the selectable desired speeds that are stored in memory 306, block 307 determines a next higher selectable desired speed vs+ and a next lower selectable desired speed vs− which are stored in memory 306. These two values are sent via an interface 310 to block 302 of the ACC unit. If the driver operates the plus or minus key to set a higher or lower desired speed, block 302 will select the more appropriate of the two values vs+ and vs− sent to it. Thus, this selected value is relayed as a new vset to governor 303 and to display control unit 305. Then two new speeds vs+ and vs− are determined as the next selectable desired speeds and sent to block 302.

From desired speed vset currently selected and a known speed deviation $\Delta v2$, which preferably corresponds to the speedometer lead, display module 308 forms the desired speed vseta to be displayed. Speed deviation $\Delta v2$ may optionally also include other corrections between selected desired speed vset and displayed desired speed vsetA. By a comparable method, display module 308 forms an instantaneous speed vFA to be displayed from instantaneous vehicle speed vF conveyed to it and a speed deviation $\Delta v1$.

In addition to the next higher value vs+ and next lower value vs− (i.e., higher and lower in comparison with currently selected desired speed vset), block 307 also determines and relays to block 302 a next higher value and a next lower value to actual travel speed vF. These two values are given here as va+ and va−. They are used when a driver activates the cruise control by pressing plus key 316 or minus key 317. If the driver operates plus key 316, for example, to activate the cruise control, desired speed vset is assumed to be the above-mentioned value va+ thus relayed. If the cruise control is activated with the minus key, value va− thus relayed is assumed to be desired speed vset. The result is that the driver can activate the cruise control while actually driving without uncomfortable extreme braking or acceleration of the vehicle by the cruise control, because the selected desired speed vset is thus in the immediate vicinity of actual travel speed vF. To check on whether this condition is actually being maintained, block 302 also receives actual travel speed vF, as described above.

What is claimed is:

1. A device comprising:
   a first control unit regulating at least one of a speed and an acceleration of a vehicle; and
   a second control unit controlling a display, the display for displaying at least one first speed and a second speed, the at least one first speed being a function of a currently prevailing speed of the vehicle and a first speed deviation, the second speed being a function of at least one desired speed selected by a driver of the vehicle and a second speed deviation, the second control unit including means for determining the at least one desired speed for regulating the at least one of the speed and the acceleration.

2. The device according to claim 1, wherein the second control unit further includes means for determining at least two selectable speeds, and wherein the second control unit transmits the at least two selectable speeds to the first control unit.

3. The device according to claim 2, wherein the at least two selectable speeds include at least one of:
   i) a first set of values, the first set of values including an incrementally higher value than the currently prevailing vehicle speed and an incrementally lower value than the currently prevailing vehicle speed, and
   ii) a second set of values, the second set of values including an incrementally higher value than a last selected desired speed and an incrementally lower value than the last selected desired speed.

4. The device according to claim 2, wherein the at least two selectable speeds are based on a real speed.

5. The device according to claim 2, wherein the at least two selectable speeds are stored in a memory.

6. The device according to claim 2, wherein the first control unit includes at least one device for selecting the at least one desired speed based upon the at least two selectable speeds.

7. The device according to claim 6, further comprising at least one operator's element for providing signals to the at least one device, the operator's element including means for selecting one of a next higher desired speed, a next lower desired speed, and a last selected desired speed.

8. The device according to claim 1, wherein the at least two selectable speeds are determined using at least one algorithm.

9. The device according to claim 1, wherein the first speed deviation and the second speed deviation relate to speedometer leads.

* * * * *

UNITED STATES PATENT AND TRADEMARK OFFICE
CERTIFICATE OF CORRECTION

PATENT NO. : 6,125,320
DATED : September 26, 2000
INVENTOR(S) : Hellman et al.

It is certified that error appears in the above-identified patent and that said Letters Patent is hereby corrected as shown below:

Column 3,
Line 50, delete "... a ...".
Line 52, change "... kmrh ..." to -- km/h --.
Line 56, change "... vseta ..." to -- vsetA --

Column 5,
Line 22, change "... vseta ..." to -- vsetA --.

Signed and Sealed this

Twentieth Day of November, 2001

Attest:

NICHOLAS P. GODICI
Attesting Officer
Acting Director of the United States Patent and Trademark Office